Sept. 3, 1940.     W. H. MUSSEY     2,213,501
DECK FOR SUPPORTING VEHICLES IN FREIGHT CARS
Filed June 6, 1938     2 Sheets-Sheet 1
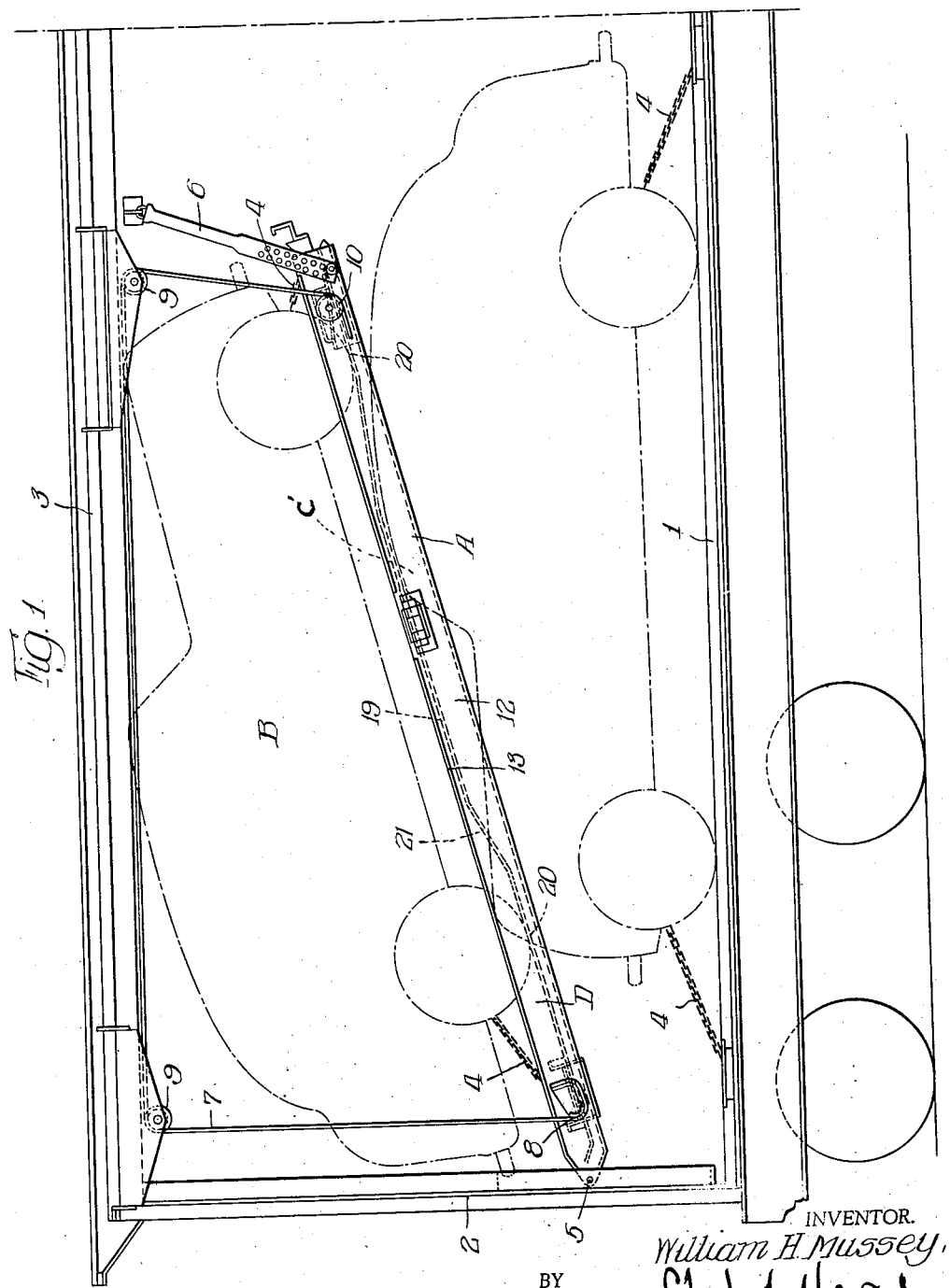
INVENTOR.
William H. Mussey,
BY
ATTORNEY.

Sept. 3, 1940.                W. H. MUSSEY                2,213,501
             DECK FOR SUPPORTING VEHICLES IN FREIGHT CARS
                    Filed June 6, 1938        2 Sheets-Sheet 2
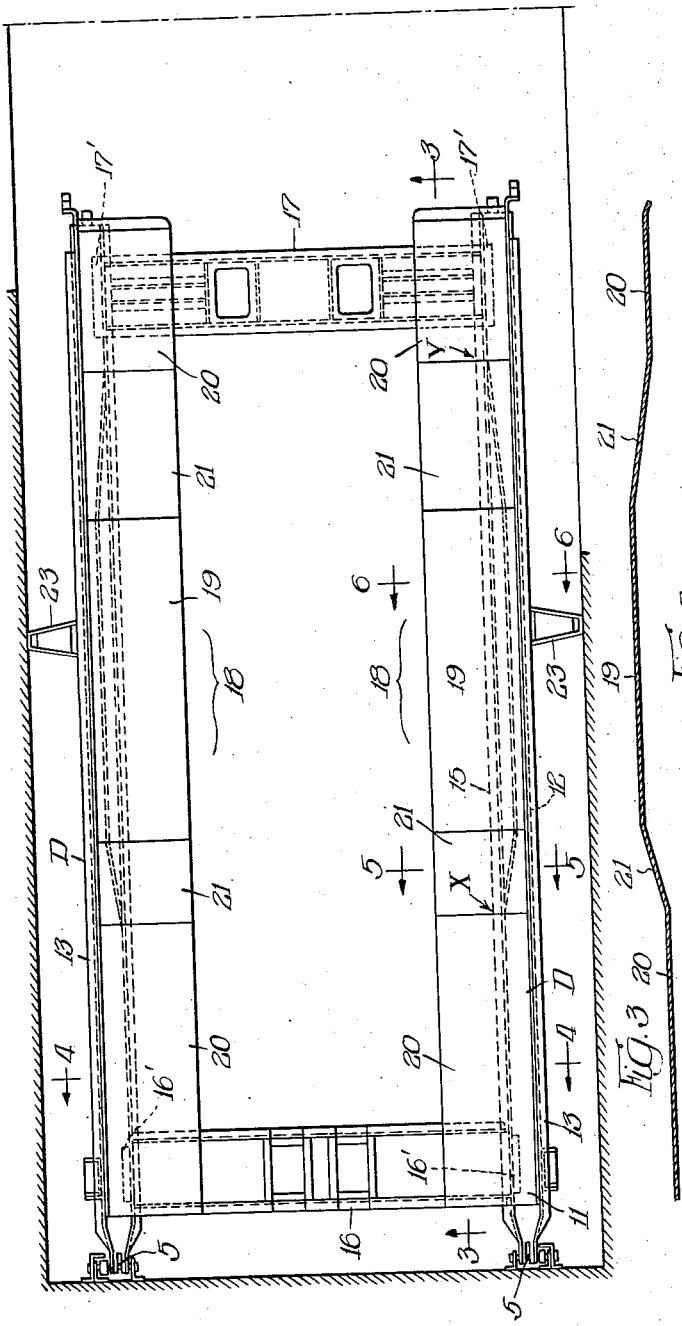
INVENTOR.
William H. Mussey,
BY
ATTORNEY.

Patented Sept. 3, 1940

2,213,501

UNITED STATES PATENT OFFICE 2,213,501

DECK FOR SUPPORTING VEHICLES IN FREIGHT CARS

William H. Mussey, Chicago, Ill., assignor, by mesne assignments, to Harold J. Forster, Washington, D. C., trustee for Association of American Railroads, Washington, D. C.

Application June 6, 1938, Serial No. 211,994

12 Claims. (Cl. 105—368)

My invention relates to an improved deck for supporting vehicles such as automobiles in freight cars and particularly of a type of deck having continuous wheel runways thereon.

In loading automobiles, preferably four in number, in freight cars it is common practice to secure two automobiles on the floor of the car back to back and to secure an automobile upon a deck over each floored automobile, the automobile on each deck having its front end adjacent the side door of the car. Preferably, decks for this purpose have an end pivoted or indexed to the car body adjacent the floor, the opposite or front end being free to be raised or tilted in order to provide space therebeneath for an automobile secured to the car floor.

In supporting one automobile over the other it is essential that the deck upon which the elevated automobile is supported be constructed so as to provide as much space as possible for the automobile beneath and also that the deck with its continuous runways be so constructed that it may be tilted at as little angle as possible with respect to the floor of the car in order to provide necessary clearance between the roof of the decked automobile and the roof of the freight car. Even though the automobile upon the deck be secured thereto as rigidly as possible there is normally a certain amount of vertical movement of the automobile with relation to the deck during transportation due to the flexibility of the inflated tires. Consequently, to prevent damage to the roof portion of the decked automobile it is necessary that sufficient space be provided between its roof and the roof of the freight car to prevent any chance of contact between the two roofs under all conditions.

The main object of my invention is to provide a deck, preferably with continuous wheel runways, constructed to provide sufficient space therebeneath for an automobile supported on the floor of the car and at the same time to permit the deck to be tilted to the minimum angle with respect to the car floor and thereby provide a maximum amount of clearance between the roof of the automobile secured to the deck and the roof of the freight car.

Further objects of my invention will appear as the following description is read in connection with the accompanying drawings forming a part of this application and in which:

Figure 1 is a side elevation of the improved deck in its tilted position within a freight car having thereon a supported automobile and having therebeneath a second automobile supported on the floor of the car;

Fig. 2 is a plan view of the deck with its continuous runways;

Fig. 3 is a longitudinal sectional side view of one of the continuous runways for the deck taken through the line 3—3, Fig. 2;

Fig. 4 is an enlarged sectional view taken through the line 4—4, of Fig. 2;

Fig. 5 is a sectional view taken through the line 5—5, of Fig. 2; and

Fig. 6 is a sectional view taken through the line 6—6, of Fig. 2.

Similar reference numbers and letters represent identical parts in all the figures.

1 represents the floor of the conventional type of freight car having the usual side doors, underframe, etc. 2 represents the car end and 3 the car roof. A designates generally the deck of this invention, B an automobile supported thereon with its rear end adjacent the end of the car and C an automobile on the floor of the car beneath the deck, this automobile having its rear end adjacent the doorways of the car. While I have shown and will describe only one deck in the car with an automobile thereon and an automobile therebeneath taking up approximately one-half of the freight car, it is understood, of course, that in the other half of the freight car the decking arrangement, etc., is duplicated. 4 represents anchoring means of any suitable type for securing the automobiles to the deck and car floor, 5 represents means whereby the rear end of the deck is pivotally attached or indexed to an end wall of the car and 6 is a suspension arm suitably attached to the deck adjacent its forward end and to the car adjacent the roof for the purpose of supporting the front end of the deck in its elevated position. This suspension means forms no part of the present invention and any other type of suspension means may be employed.

Also any suitable hoisting mechanism and means may be employed to raise and tilt the forward end of the improved deck and merely as an illustration, such means may include a pair of cables such as 7, each pair suitably attached adjacent the rear end of the deck as at 8, and adapted to run over pulleys 9 located adjacent the roof of the car. The cables may thence run under pulleys 10 on the front end of the deck adjacent the corners thereof, and thence to a hoisting mechanism upon the deck or otherwise located. As the hoisting mechanism and means for raising the deck does not form a part of the present invention it is thought no further reference to such mechanism and means is required.

Coming now to the deck structure itself, generally designated by A, D represents as a whole the side frame members substantially of U-shape, each having a base portion 11, Figure 4, and an upwardly extending outer leg 12, this leg in turn having an outwardly extending reinforcing flange 13. Furthermore, the member D has an upwardly extending inner leg 14 having an inwardly extending attaching flange 15. The two side frame members D are connected at their ends by cross members 16, 17, of any suitable shape, the former being a cross member adjacent the rear or pivoted end of the deck and the latter being a cross member adjacent the front or free end of the deck. The ends of the cross members are welded or otherwise secured to side frame members D at points 16', 17', or other suitable points. It will be seen that the two side frame members D with the end members 16, 17 comprise what may be termed a frame with a central opening.

In order to provide an extra amount of space between the U-shaped side frame members D of the deck for the top sides of the floored automobile, I have narrowed a portion of the base 11 and outwardly bowed or concaved a portion of the inner leg 14 of each side frame member D between points X—Y, Figure 2, intermediate the ends of said side frame members and changed the angle of the inner leg 14 between points X—Y, thus providing recesses to afford a greater distance between the side frame members substantially midway the ends of the deck. Thus, in Figure 4, it will be seen that the ends of the members D, where they are connected to the ends of the cross members 16, 17, have a comparatively wide base portion 11 and short vertical inner leg 14, whereas in Figure 5, a cross-sectional view taken through the line 5—5 of Figure 2, the base portion of the U-shape member D is narrowed as at 11' and the inner leg 14' is increased in height. And still further, it will be noted in Figure 6, a cross-sectional view taken through the line 6—6, of Figure 2, the base portion of the U-shape member D is further narrowed as at 11² and the inner leg 14² is further increased in height.

As shown clearly in Fig. 2 of the drawings, the distance from the inner edge of the flange 15 on the inner leg 14 to the outer leg 12 is uniform throughout substantially the entire length of the U-shaped side frame member D. As shown in Fig. 4 of the drawings, the inner leg 14 is substantially vertical to the base portion 11 of the U-shaped side frame member at the end portions of the deck. As described hereinbefore, the base portion is narrowed or vertically concaved between points X—Y, Fig. 2, to afford a recess in each frame member. Fig. 5 clearly shows the base portion 11' to be narrower than the base portion 11 shown in Fig. 4; and Fig. 5 further reveals the inner leg 14' extending upwardly and inwardly at an obtuse angle to the base portion 11'. Referring to Fig. 6, it is clearly shown that at the line 6—6 of Fig. 2 the base portion is further narrowed as at 11², and the inner leg 14² extends upwardly and inwardly at a greater obtuse angle to the base portion 11² than in Fig. 5. It is thus seen that the inner leg represented by the numerals 14, 14' and 14² in Figs. 4, 5 and 6 respectively, is vertically concaved or outwardly bowed in the direction of the outer leg 12, which results in the provision of more space between the points X—Y of Fig. 2 for the upper part of the car that is mounted on the floor beneath the elevated deck. It will be seen from the above that when the side frame members are provided with the narrowed base member between the points X—Y as shown in Fig. 2 and are provided with outwardly bowed inner legs in the direction of the car sides, a recess is provided in a vertical wall of the longitudinal frame members intermediate the ends of said members.

After the deck is tilted with an automobile thereon, the second automobile C is run beneath the deck and secured to the floor with its top portion C' located between the concaved or outwardly bowed part of the base 11 of each member D. It will be readily seen that if each member D was not narrowed at its central portion as just described to provide an extra wide space between said members, less space would be available for the top portion C' of the automobile beneath the deck and, consequently, it would be necessary to tilt the deck at a greater angle with respect to the floor to accommodate an automobile therebeneath.

In addition to the construction just described, I provide a novel continuous wheel runway for the deck which when combined with the frame members D, assists in providing additional space between the roof of the decked automobile and the roof of the freight car.

Each continuous runway, generally designated by 18, has a bowed-up central portion 19, as shown by Figure 3, this portion 19 being joined to end wheel supporting portions 20 by offsets or downwardly inclined portions 21. These runways 18 are supported upon side frame members D and end portions of cross members 16, 17. When in position the roof of the automobile C beneath the deck extends under the bowed-up portion 19, thus permitting the deck as a whole to be tilted at less angle with respect to the car floor than would be possible if the entire runway surface was on the same plane. The wheels of the decked automobile B, being supported upon lowered portions 20 of the runways, there is thus provided ample space between the roof of the automobile B and the roof of the freight car and likewise due to the lowered position of the wheels of the decked automobile upon the portions 20 of the runways, the deck as a whole is tilted at an angle less than customarily and thus permits ample space between the roof of the decked automobile B and the roof of the freight car.

It is necessary, of course, to support the runways 18 and their bowed-up portions 20 upon the side frame members D in a manner to prevent flexing of the runways when loaded for service. This is accomplished by providing an upstanding flange 22 upon the outer edge of the runways and by welding or otherwise securing this flange to the upstanding outer leg 12 of the member D as shown by Figure 4. Furthermore, the inwardly extending flange 15 at the top of the inner leg 14 of the member 9 is secured to the under side of the runways by welding or otherwise. To provide for the support of the bowed-up portion 19 of the runway, the inner leg 14, with its flange 15, is of a height which corresponds with the height of the portion 19 as shown by 14², Figure 6, it being understood that the flange 22 of the runway is attached to the leg 12 near its top, shown by Fig. 6, the leg 12 being of the same height throughout.

To assist in preventing lateral motion of the deck when it is being raised or lowered, I provide guides 23 suitably affixed to the legs 12 of the deck and extending across and approximately to the side walls of the freight car.

From the above description it will be seen that the novel side frame members of the deck with their bowed-out portions and the wheel runways with their bowed-up portions permit automobiles of maximum width, height and length to be shipped with sufficient clearance between the automobiles upon the floor and the deck and between the automobiles upon the deck and the roof of the freight car, thus minimizing the danger of damage to the shipped automobiles.

While I have shown and described a preferred embodiment of the invention, it will be understood that it is not to be limited to all the details shown, but is capable of modification and variation within the spirit of the invention and within the scope of the appended claims.

What I claim is:

1. In a deck for supporting a vehicle in a tilted position in a freight car, said deck including side frame members each of substantially U-shape in cross section and having upstanding inner and outer legs joined by a base portion, each of said members intermediate its ends having its inner leg and base vertically concaved to form a recess to accommodate a side of the last mentioned vehicle adjacent the top thereof and wheel supporting runways secured to said legs for the support of the first mentioned vehicle.

2. In a deck for supporting a vehicle in a tilted position in a freight car above a second vehicle located upon the floor of the car, said deck including side frame members each of substantially U-shape in cross section and having upstanding inner and outer legs joined by a base portion, each of said members intermediate its ends having its inner leg and base vertically concaved to form a recess to accommodate a side of the last mentioned vehicle adjacent the top thereof, said inner leg forming said recess being of greater height than the remaining portion of said leg and a continuous wheel supporting runway for the support of the first mentioned vehicle secured to said inner leg from end to end, said runway portion overlying said recess being upwardly bowed to provide additional space for the top of the vehicle located beneath the deck.

3. In a deck for supporting a vehicle in a tilted position in a freight car above a second vehicle located upon the floor of the car, said deck including side frame members each of substantially U-shape in cross section and having an upstanding inner leg and upstanding outer leg of greater height than said inner leg, both legs being joined by a base portion, each of said members intermediate its ends having its inner leg and base vertically concaved to form a recess to accommodate a side of the last mentioned vehicle adjacent the top thereof, said inner leg forming said recess being of greater height than the remaining portion of said leg and a continuous wheel supporting runway for the support of the first mentioned vehicle secured to the top of said inner leg from end to end and to a vertical face of said outer leg, said runway portion overlying said recess being upwardly bowed to provide additional space for the top of the vehicle beneath the deck.

4. In a deck for supporting a vehicle in a tilted position in a freight car above a second vehicle located upon the floor of the car, said deck including side frame members each of substantially U-shape in cross section and having an upstanding inner leg and upstanding outer leg of greater height than said inner leg, both legs being joined by a base portion, each of said members intermediate its ends having its inner leg and base vertically concaved to form a recess to accommodate a side of the last mentioned vehicle adjacent the top thereof, said inner leg forming said recess being of greater height than the remaining portion of said leg and a continuous wheel supporting runway secured to the top of said inner leg from end to end and to a vertical face of said outer leg, said runway portion overlying said recess being upwardly bowed to provide additional space for the top of the vehicle beneath the deck and the lower runway portions on opposite sides of the upwardly bowed portion being adapted for the reception of the wheels of the first mentioned vehicle.

5. In a deck for supporting a vehicle in a tilted position in a freight car, said deck including side frame members each of substantially U-shape in cross section and having an upstanding inner leg having an outwardly extending reinforcing flange and an upstanding outer leg having an outwardly extending attachment flange, a base portion connecting said legs, each of said members intermediate its ends having its inner leg and base vertically concaved to form a recess to accommodate a side of the last mentioned vehicle adjacent the top thereof and wheel supporting runways for the support of the first mentioned vehicle each having an upwardly extending attachment flange at its outer edge adapted to be secured to a vertical face of said outer leg and a portion adapted to be secured to said inwardly extending flange of said inner leg.

6. In a deck for supporting vehicles in freight cars, said deck including side frame members of substantially U-shape in cross section, each having upstanding inner and outer legs joined by a base portion, a recess of substantial length in a vertical wall of each side frame member intermediate its ends and a wheel supporting runway mounted on each side frame member.

7. In a deck for supporting a vehicle in a tilted position in a freight car above a second vehicle located on the floor of the car, said deck including side frame members of substantially U-shape in cross section, each side frame member having upstanding inner and outer legs joined by a base portion, each base portion being of decreased width for a substantial distance intermediate the ends of the side frame member and each inner leg being of increased height for a substantial distance intermediate the ends of the side frame member whereby the deck is adapted to provide additional space for the floor supported vehicle when said deck is in elevated position.

8. In a deck for supporting a vehicle in a freight car above a floor supported vehicle, said deck comprising wheel supporting runways, end cross members and side frame members, said saide frame members each having an upstanding inner and outer leg joined by a base member, the inner legs being recessed for a substantial length intermediate the ends of the side frame members.

9. A deck for supporting a vehicle in a freight car comprising side frame members and end cross members, the side frame members being of substantially U-shape in cross section and having upstanding inner and outer legs joined by a base portion, said base portion being of decreased width intermediate the ends of said member, said inner leg being recessed for a substantial distance intermediate the ends of said member and a continuous wheel runway supported upon each side frame member, each runway having a bowed-up portion intermediate its ends.

10. A deck for supporting a vehicle in a tilted position in a freight car above a floor supported vehicle, said deck including spaced side frame members of substantially U-shape in cross section the side frame member having upstanding inner and outer legs joined by a base portion, the inner leg of each side frame member being recessed for a substantial distance intermediate the ends of the side frame member, providing a greater distance between the recessed portions of the inner legs than between said inner legs at the ends of said spaced side frame members whereby additional space is available for accommodating the floor supported vehicle.

11. A deck for supporting a vehicle in a tilted position above a floor supported vehicle, said deck including spaced wheel supporting runways mounted on spaced side frame members of substantially U-shape in cross section, each side frame member having upstanding inner and outer legs joined by a base portion, the inner leg of each side frame member being recessed toward the adjacent outer leg for a substantial length intermediate the ends of the deck.

12. A deck for supporting a vehicle in a tilted position above a floor supported vehicle, said deck including spaced wheel supporting runways mounted on spaced side frame members of substantially U-shape in cross section, each side frame member having upstanding inner and outer legs joined by a base portion, the inner leg of each side frame member being recessed toward the adjacent outer leg for a substantial length intermediate the ends of the deck and the said wheel supporting runways being upwardly bowed intermediate the ends of the deck.

WILLIAM H. MUSSEY.